United States Patent
Matusik et al.

(10) Patent No.: US 7,602,990 B2
(45) Date of Patent: Oct. 13, 2009

(54) MATTING USING CAMERA ARRAYS

(75) Inventors: Wojciech Matusik, Cambridge, MA (US); Shmuel Avidan, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 278 days.

(21) Appl. No.: 11/238,741

(22) Filed: Sep. 29, 2005

(65) Prior Publication Data

US 2007/0070226 A1    Mar. 29, 2007

(51) Int. Cl.
*H04N 9/04* (2006.01)

(52) U.S. Cl. .................. 382/260; 348/159; 348/275; 348/E5.058

(58) Field of Classification Search .................. 382/260; 348/159, 275, E5.058
See application file for complete search history.

(56) References Cited

U.S. PATENT DOCUMENTS

| | | | |
|---|---|---|---|
| 6,738,496 B1 * | 5/2004 | Van Hall | 382/101 |
| 2004/0062439 A1 * | 4/2004 | Cahill et al. | 382/173 |
| 2006/0221248 A1 * | 10/2006 | McGuire et al. | 348/587 |
| 2007/0013813 A1 * | 1/2007 | Sun et al. | 348/587 |

OTHER PUBLICATIONS

Wilburn et al. "High Performance Imaging Using Camera Arrays" Jul. 2005, ACM Trans. Graph. vol. 24, No. 3, 765-776.*

Porter et al., "Compositing digital images," in Proceeedings of the 11th annual conference on Computer graphics and interactive techniques, ACM Press, pp. 253-259, 1984.

Smith et al., "Blue screen matting, Proceedings of the 23rd annual conference on Computer graphics and interactive techniques," ACM Press, pp. 259-268.

Ruzon et al., "Alpha estimation in natural images," CVPR, vol. 1, pp. 18-25, 2000.

Hillman et al., "Alpha channel estimation in high resolution images and image sequences," Proceedings of IEEE CVPR 2001, IEEE Computer Society, vol. 1, pp. 1063-1068, 2001.

Chuang et al., "A Bayesian approach to digital matting," Proceedings of IEEE CVPR 2001, IEEE Computer Society, vol. 2, pp. 264-271, 2001.

Chuang et al., "Video matting of complex scenes," ACM Trans. on Graphics 21, 3, pp. 243-248, Jul. 2002.

Sun et al, "Poisson matting," ACM Trans. on Graphics, Aug. 2004.

Zitnick et al., "High-quality video view interpolation using a layered representation," ACM Trans. on Graphics 23, 3, pp. 600-608, 2004.

(Continued)

*Primary Examiner*—Samir A. Ahmed
*Assistant Examiner*—Stephen R Koziol
(74) *Attorney, Agent, or Firm*—Dirk Brinkman; Gene Vinokur (57) ABSTRACT

A method extracts an alpha matte from images acquired of a scene by cameras. A depth plane is selected for a foreground in the scene. A trimap is determined from a set of images acquired of the scene. An epipolar plane image is constructed from the set of images and the trimap, the epipolar plane image including scan lines. Variances of intensities are measured along the scan lines in the epipolar image, and an alpha matte is extracted according to the variances.

20 Claims, 4 Drawing Sheets

OTHER PUBLICATIONS

Debevec et al., "A lighting reproduction approach to live action compositing," ACM Transactions on Graphics 21, 3, pp. 547-556, 2002.

Favaro et al., "Seeing beyond occlusions (and other marvels of a finite lens aperture)," Proc. of the IEEE Intl. Conf. on Computer Vision and Pattern Recognition, p. 579, 2003.

Schechner et al, "Separation of transparent layers using focus," International Journal of Computer Vision, pp. 25-39, 2000.

McGuire et al., "Defocus Video Matting," ACM Transactions on Graphics 24, 3, 2003.

Isaksen et al., "Dynamically reparameterized light fields," SIGGRAPH 2000, pp. 297-306, 2000.

* cited by examiner

MATTING USING CAMERA ARRAYS

FIELD OF THE INVENTION

This invention relates generally to processing images acquired by cameras, and more particularly to extracting mattes from videos acquired by an array of cameras.

BACKGROUND OF THE INVENTION

Matting and compositing are frequently used in image and video editing, 3D photography, and film production. Matting separates a foreground region from an input image by estimating a color F and an opacity $\alpha$ for each pixel in the image. Compositing uses the matte to blend the extracted foreground with a novel background to produce an output image representing a novel scene. The opacity $\alpha$ measures a 'coverage' of the foreground region due to either partial spatial coverage or partial temporal coverage, i.e., motion blur. The set of all opacity values $\alpha$ is called the alpha matte, the alpha channel, or simply the 'matte'.

The matting problem can be formulated as follows: An image of a foreground against an opaque black background in a scene is $\alpha F$. An image of the background without the foreground is B. An alpha image or matte, where each pixel represents a partial coverage of that pixel by the foreground, is $\alpha$. The image $\alpha$ is essentially an image of the foreground object 'painted' white, evenly lit, and held against the opaque background. The scale and resolution of the foreground and background images can differ due to perspective foreshortening.

The notions of an alpha matte, pre-multiplied alpha, and the algebra of composition have been formalized by Porter et al., "Compositing digital images," in Proceedings of the $11^{th}$ Annual Conference on Computer Graphics and Interactive Techniques, ACM Press, pp. 253-259, 1984. They showed that for a camera, the image $\alpha F$ in front of the background image B can be expressed by a linear interpolation:

$$I = \alpha F + (1-\alpha)B,$$

where I is an image, $\alpha F$ is the pre-multiplied image of the foreground against an opaque background, and B is the image of the opaque background in the absence of the foreground.

Matting is described generally by Smith et al., "Blue screen matting," Proceedings of the 23rd Annual Conference on Computer Graphics and Interactive Techniques," ACM Press, pp. 259-268, and U.S. Pat. No. 4,100,569, "Comprehensive electronic compositing system," issued to Vlahos on July 11, 1978.

Conventional matting requires a background with known, constant color, which is referred to as blue screen matting. If a digital camera is used, then a green matte is preferred. Blue screen matting is the predominant technique in the film and broadcast industry. For example, broadcast studios use blue matting for presenting weather reports. The background is a blue screen, and the foreground region includes the presenter standing in front of the blue screen. The foreground is extracted, and then superimposed onto a weather map so that it appears that the presenter is actually standing in front of a map. However, blue screen matting is costly and not readily available to casual users. Even production studios would prefer a lower-cost and less intrusive alternative.

Ideally, one would like to extract a high-quality matte from an image or video with an arbitrary, i.e., unknown, background. This process is known as natural image matting. Recently, there has been substantial progress in this area, Ruzon et al., "Alpha estimation in natural images," CVPR, vol. 1, pp. 18-25, 2000; Hillman et al., "Alpha channel estimation in high resolution images and image sequences," Proceedings of IEEE CVPR 2001, IEEE Computer Society, vol. 1, pp. 1063-1068, 2001; Chuang et al., "A Bayesian approach to digital matting," Proceedings of IEEE CVPR 2001, IEEE Computer Society, vol. 2, pp. 264-271, 2001; Chuang et al., "Video matting of complex scenes," ACM Trans. on Graphics 21, 3, pp. 243-248, July, 2002; and Sun et al, "Poisson matting," ACM Trans. on Graphics, August 2004. The Poisson matting of Sun et al. solves a Poisson equation for the matte by assuming that the foreground and background are slowly varying. Their method interacts closely with the user by beginning from a manually constructed trimap. They also provide 'painting' tools to correct errors in the matte.

Unfortunately, all of those methods require substantial manual intervention, which becomes prohibitive for long image sequences and for non-professional users. The difficulty arises because matting from a single image is fundamentally under-constrained.

It is desired to perform matting using non-intrusive techniques. That is, the scene does not need to be modified. It is also desired to perform the matting automatically. Furthermore, it is desired to provide matting for 'rich' natural images, i.e., images with a lot of fine, detailed structure.

Most natural image matting methods require manually defined trimaps to determine the distribution of color in the foreground and background regions. A trimap segments an image into background, foreground and unknown pixels. Using the trimaps, those methods estimate likely values of the foreground and background colors of unknown pixels, and use the colors to solve the matting equation.

Bayesian matting techniques, and their extension to image sequences, produce the best results in many applications. However, those methods require manually defined trimaps for key frames. This is tedious for a long image sequence. It is desired to provide a method that does not require user intervention, and that can operate in real-time as an image sequence is acquired.

Another matting system is described by Zitnick et al., "High-quality video view interpolation using a layered representation," ACM Trans. on Graphics 23, 3, pp. 600-608, 2004. They acquire videos with a horizontal row of eight cameras spaced over about two meters. They measure depth discrepancies from stereo disparity using sophisticated region processing, and then construct a trimap from the depth discontinuities. The actual matting is determined by the Bayesian matting of Chuang et al. Their system is not real-time. The system requires off-line processing to determine both the depth and the alpha mattes.

It is desired to extract a matte without recovering the scene 3D structure so that mattes for complex, natural scenes can be extracted.

Difference matting, also known as background subtraction, solves for a and the alpha multiplied foreground, $\alpha F$, given background and trimap images, Qian et al., "Video background replacement without a blue screen," Proceedings of ICIP, vol. 4, 143-146, 1999. However, difference matting has limited discrimination at the borders of the foreground.

Another method uses back lighting to determine the matte. Back lighting is a common segmentation method used in many computer vision systems. Back lighting has also been used in image-based rendering systems, Debevec et al., "A lighting reproduction approach to live action compositing," ACM Transactions on Graphics 21, 3, pp. 547-556, 2002. That method has two drawbacks. First, active illumination is required, and second, incorrect results may be produced near object boundaries because some objects become highly reflective near grazing angles of the light.

Scene reconstruction is described by Favaro et al., "Seeing beyond occlusions (and other marvels of a finite lens aperture)," Proc. of the IEEE Intl. Conf. on Computer Vision and Pattern Recognition, p. 579, 2003. That method uses defocused images and gradient descent minimization of a sum-squared error. The method solves for coarse depth and a binary alpha.

Another method uses a depth-from-focus system to recover overlapping objects with fractional alphas, Schechner et al, "Separation of transparent layers using focus," International Journal of Computer Vision, pp. 25-39, 2000. They position a motorized CCD axially behind a lens to acquire images with slightly varying points of focus. Depth is recovered by selecting the image plane location that has the best focused image. That method is limited to static scenes.

Another method uses three video streams acquired by three cameras with different depth-of-field and focus that share the same center of projection to extract mattes for scenes with unconstrained, dynamic backgrounds, McGuire et al., "Defocus Video Matting," ACM Transactions on Graphics 24, 3, 2003, and U.S. patent application Ser. No. 11/092,376, filed by McGuire et al. on Mar. 29, 2005, "System and Method for Image Matting." McGuire et al. determine alpha mattes for natural video streams using three video streams that share a common center of projection but vary in depth of field and focal plane. However, their method takes a few minutes per frame.

SUMMARY OF THE INVENTION

An embodiment of the invention provides a real-time system and method for extracting a high-quality matte from images acquired of a natural, real world scene. A depth plane for a foreground region of the scene is selected approximately. Based on the depth plane, a trimap is determined. Then, the method extracts a high-quality alpha matte by analyzing statistics of epipolar plane images (EPI). The method has a constant time per pixel.

The real-time method can extract high-quality alpha mattes without the use of active illumination or a special background, such as a blue screen.

Synchronized sets of images are acquired of the scene using a linear array of cameras. The trimap is determined according to the selected depth plane. Next, high quality alpha mattes are extracted based on an analysis of statistics of the EPI, specifically, intensity variances measured along scan lines in the EPI.

As an advantage, the method does not determine the depth of the background, or reconstruct the 3D scene. This property produces a high quality matte. The method works with arbitrarily complex background scenes. The processing time is proportional to the number of acquired pixels, so the method can be adapted to real-time videos of real world scenes.

DETAILED DESCRIPTION OF THE PREFERRED EMBODIMENT

Figure 1:
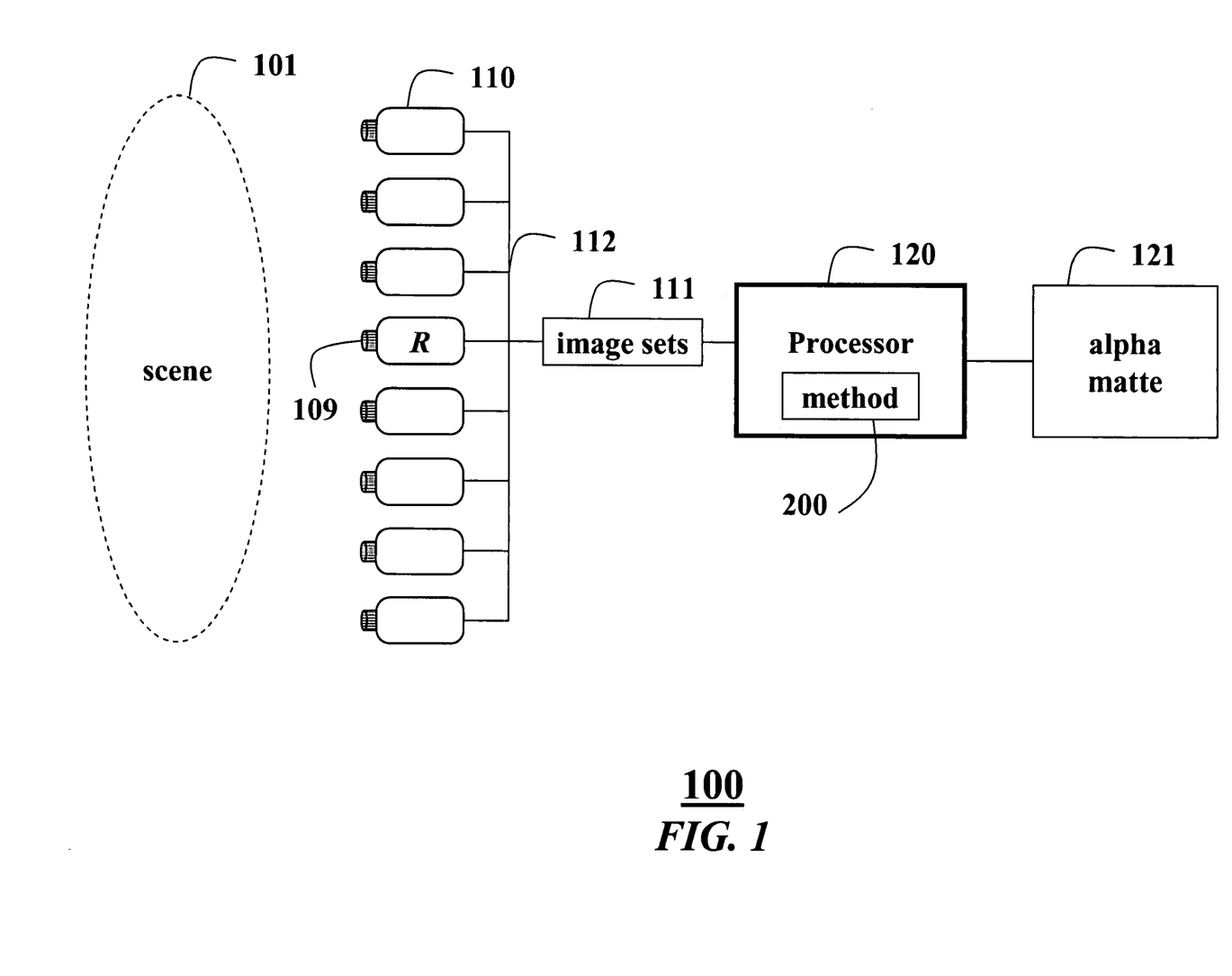
FIG. 1 is a schematic of a system for matting according to an embodiment of the invention.

FIG. 1 shows a system 100 for extracting an alpha matte according to an embodiment of the invention. A linear array of synchronized cameras 110 acquires sets of images 111 of a scene 101. For example, all images in each set are acquired in parallel at a particular instant in time. Sets are acquired at up to thirty per second.

Figure 2:
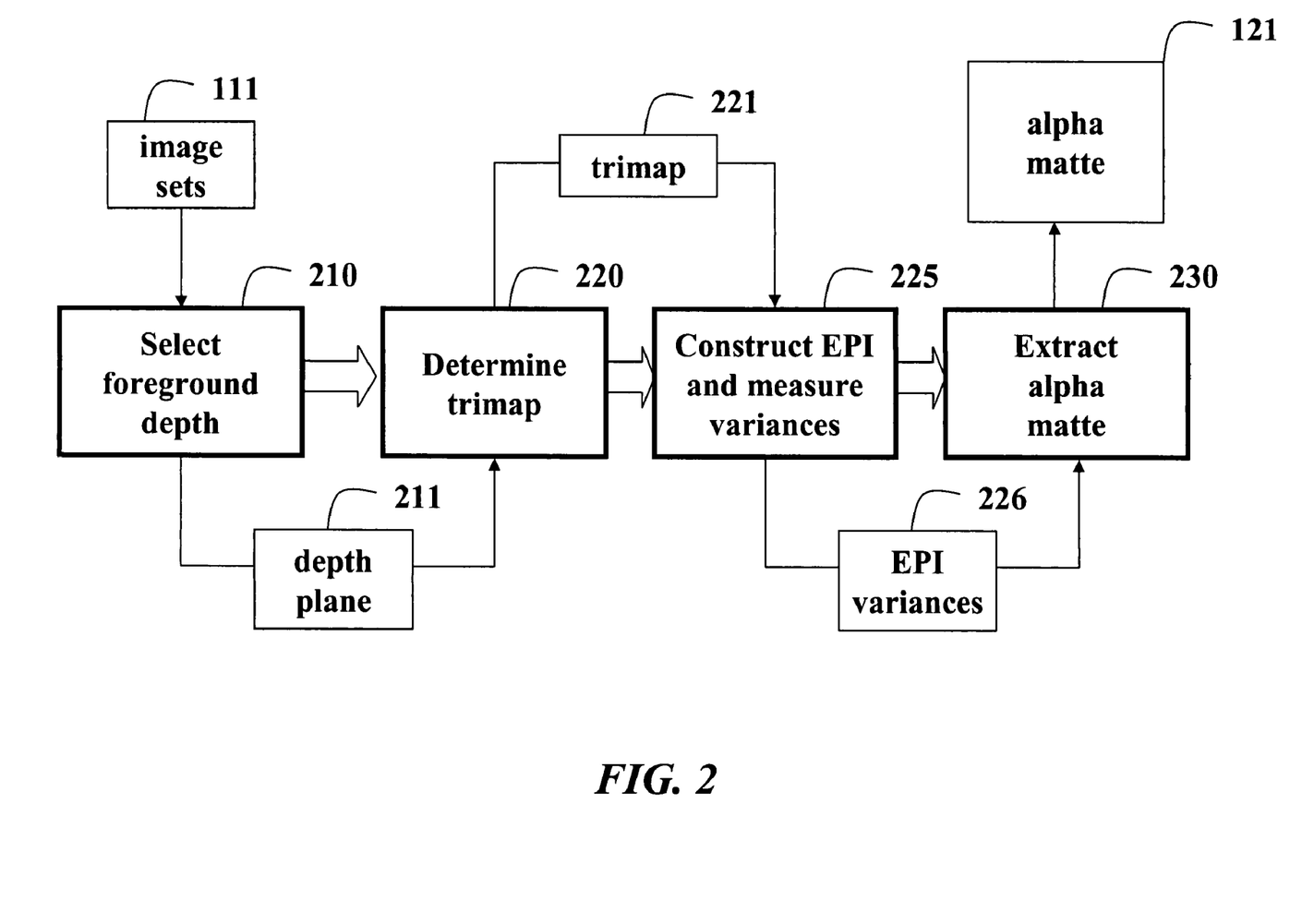
FIG. 2 is a flow diagram of a method for matting according to an embodiment of the invention.

A processor 120 executes a method 200 according to an embodiment of the invention to produce the alpha matte 121.

In a preferred embodiment, we use eight cameras arranged linearly along a horizontal axis. It should be noted that a second linear array of cameras arranged along a vertical axis can also be used. That is, the method and system can work with any arrangement of cameras as long as centers of projections of the cameras are co-planar, i.e., the centers are on an identical virtual plane.

It should be understood that more or fewer cameras can be used. A resolution of each camera is 640×480 pixels in a Bayer pattern. The cameras have external hardware triggers, and can acquire the synchronized sets of images at up to 30 sets per second. The cameras are connected to the 3 GHz processor via a Firewire link 112. The synchronized images of each set 111 can be presented to the processor 120 in parallel.

We geometrically calibrate both extrinsic and intrinsic parameters of the camera array using well-known, conventional computer vision techniques. Centers of projection of our cameras are arranged linearly. Furthermore, we determine homographies that rectify all camera planes using conventional techniques. Photometric calibration is not essential, because our method 200 uses intensity values.

One camera, near the center of the array, is defined as a reference camera R 109. We extract the alpha matte for the image of the reference camera. The reference camera can be a high quality, high definition movie camera, and the rest of the cameras can be low quality cameras.

As shown in FIG. 2, our matting method 200 has the following major steps, selecting 210 a foreground depth 211, determining 220 a trimap 221, constructing 225 epipolar plane images (EPI) and measuring pixel intensity variances 226 in the EPI, and extracting 230 the alpha matte 121 according to the variances 226 along scan lines in the EPI.

Selecting Foreground Depth

We describe an intuitive way for selecting 210 the foreground depth 211 and an aperture for light field data. This process is similar to a dynamically reparameterized light field method described by Isaksen et al., "Dynamically reparameterized light fields," *SIGGRAPH* 2000, pp. 297-306, 2000, incorporated herein by reference.

With our system, a user can interactively set a synthetic depth plane. We set the camera position to the location of the reference camera 109 in the array 110. Depth ranging methods can be used to select the depth plane automatically. Moreover, we use relatively large apertures. This results in a shallow depth of field. Thus, only parts of the foreground region of the scene 101 that are at the depth plane are in focus in the sets of images 111. We have found that this is a relatively simple way of selecting the depth of the foreground.

If the sets of images 111 are pre-recorded, then we can perform the matting method for scene elements at different depths, and extract mattes for the various depth elements separately.

Trimap Determination

The trimap determination step 220 classifies all pixels in an image as background, foreground or unknown. For our matting step 230, we only need to specify pixels as definitely background or unknown. As stated above, the foreground depth 211 is preselected 210. The tripmap information is sufficient to construct the EPI.

We measure variances of pixel intensities along lines in the EPI at the selected depth plane 211. Alternatively one can view this as measuring intensity variances of values of a point, in 3D, projected onto all camera planes.

However, the depth plane is only a rough approximation of the depth of the foreground. Therefore, we assume a predetermined depth range of the foreground. We prefilter the light field data of the input images 111 to take this depth range into account before we measure the variances. The filtering can be performed with a convolution kernel having a size corresponding to the depth range.

Because the foreground is typically associated with an object that is the closest to the camera array 110, occlusion is not a problem in our case, except for self-occlusions within the object.

We start by acquiring a linear light field of the scene by the array of cameras 110. Let us consider one epipolar plane image (EPI) constructed from a particular set of images, see FIG. 3.

Figure 3:
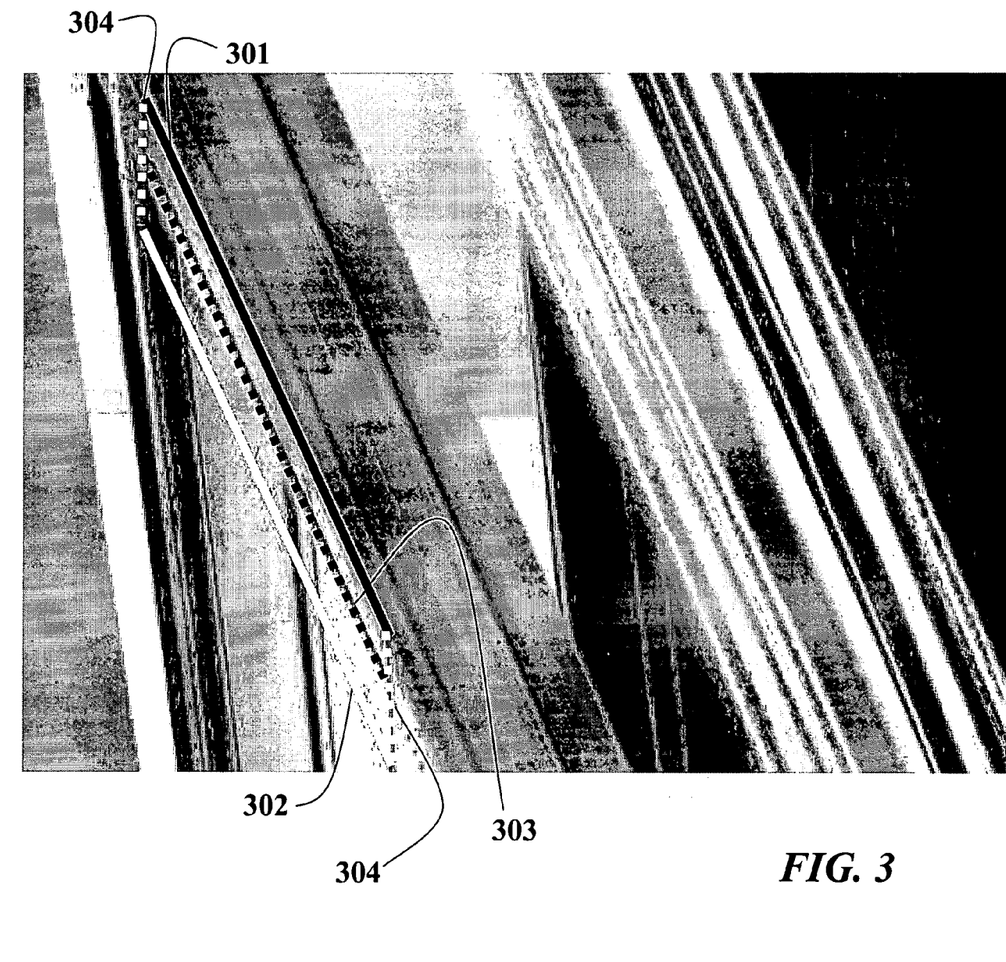
FIG. 3 is an epipolar plane image according to an embodiment of the invention.

To obtain the EPI, we stack the identical scan line from all images of the set, acquired at a particular instant in time. A 3D point in the scene 101 corresponds to a particular scan line in this EPI, and an orientation of the scan line corresponds to a depth of the point. Points in the foreground span the entire EPI because the foreground points are not occluded. Background scene elements correspond to line segments because they can be occluded by foreground or other background elements.

For foreground points, where the alpha value is between 0 and 1, we record a mixture of both foreground and background values. The value of alpha is a mixing coefficient of foreground and background. In our formulation, we assume that the value of background changes when observing the same foreground point from different directions by the cameras of the array 110. We assume that the alpha value for the foreground point is fixed in the different views.

In the matting formulation, we have three unknowns: the alpha matte $\alpha$, the foreground F, and the background B. In general, we are only interested in determining the value of alpha and the value of the alpha-multiplied foreground.

If we know the values of the background and the corresponding values observed in the image, i.e., at least two pairs, then we could determine the value of the foreground and alpha. This is equivalent to determining foreground depths.

However, in our approach, we avoid the depth computation because of the complexity, time and errors that can result from a 3D scene reconstruction.

Instead of determining correspondences between observed intensities and background values, we analyze statistics in the epipolar plane images. In particular, we measure intensity variances of the foreground and background. Then, we derive our alpha values in terms of these variances.

Consider a scene point, denoted with solid black line 301 in FIG. 3, for which we would like to determine the alpha value. Also, consider a closest point that belongs to the background denoted with solid white line 302, and the closest point in the foreground denoted with the dashed black line 303.

We make the following assumptions.

Values along the dashed black line 303 are a fixed linear combination of two statistically independent variables, i.e., the foreground and background.

Second order statistics, i.e., the variances, of the background variable along the dashed black line 303 are the same as the statistics along the solid white line 302. This is true because scene points on the white line 302 at some point intersect dashed black line 303.

Second order statistics of the foreground variable along the solid white line 302 are the same as statistics along the solid black line 301. This is equivalent to stating that view-independent properties, e.g., the albedo, of the foreground and background point can be completely different but their view-dependent statistics, e.g., specularity level, are identical.

If we know the approximate depth of the background, denoted with dashed white lines 304, it is beneficial to only determine the statistics along the lines having an orientation corresponding to lines 301-303. This is because we get a better approximation of the corresponding intensity variances along these lines.

Now, we describe the method formally. The conventional matting equation for an image I is:

$$I=\alpha F+(1-\alpha)B, \quad (1)$$

where $\alpha$ is the alpha matte, F the foreground, and B the background. We assume that that I, B and F are statistical variables. Thus, the variance of these variables can be expressed as:

$$\text{var}(I)=\text{var}[\alpha F+(1-\alpha)B]. \quad (2)$$

If we assume that B and F are statistically independent then:

$$\begin{aligned}\text{var}(I) &= \text{var}[\alpha F + (1-\alpha)B] \\ &= \langle[(\alpha F+(1-\alpha)B)-\langle\alpha F+(1-\alpha)B\rangle]^2\rangle \\ &= \langle[\alpha(F-\langle F\rangle)+(1-\alpha)(B-\langle B\rangle)]^2\rangle \\ &= \alpha^2\langle(F-\langle F\rangle)^2\rangle+(1-\alpha)^2\langle(B-\langle B\rangle)^2\rangle \\ &= \alpha^2\text{var}(F)+(1-\alpha)^2\text{var}(B)\end{aligned} \quad (3)$$

where $\langle X \rangle$ denotes the mean value of X.

The assumption that B and F are statistically independent is manifested in the third line of equation (3), where the term $(1-\alpha)(B-\langle B\rangle)$ is assumed to be zero. In order to determine $\alpha$, we solve a quadratic equation:

$$[\text{var}(F)+\text{var}(B)]\alpha^2-2\text{var}(B)\alpha+[\text{var}(B)-\text{var}(I)]=0. \quad (4)$$

The solutions to this quadratic equation are:

$$\alpha = \frac{\text{var}(B) \pm \sqrt{\Delta}}{\text{var}(F)+\text{var}(B)}, \quad \text{where} \quad (5)$$

$$\Delta = \text{var}(I)[\text{var}(F)+\text{var}(B)]-\text{var}(F)\text{var}(B) \quad (6)$$

Figure 4:
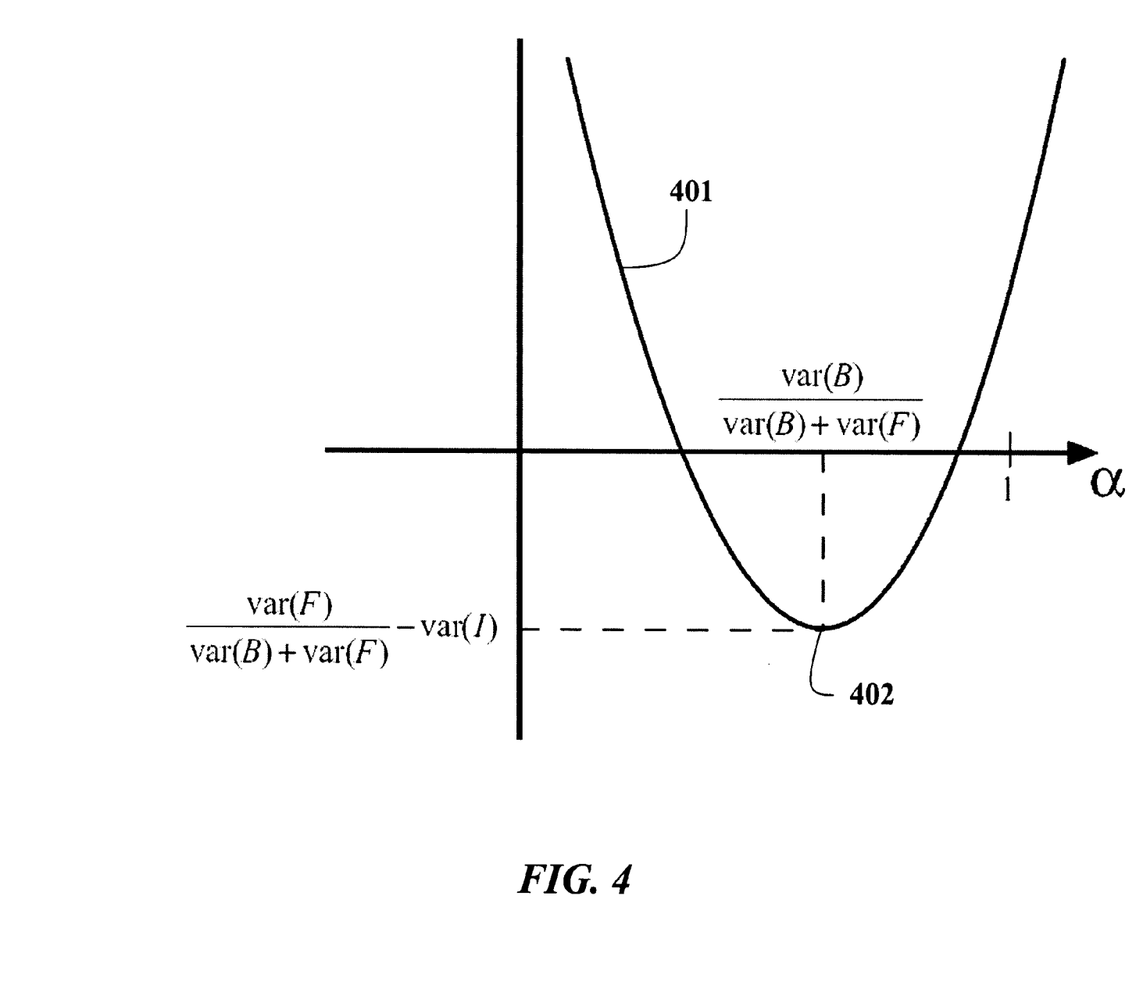
FIG. 4 is a geometric solution for the matting according to an embodiment of the invention.

FIG. 4 shows a parabola 401 that corresponds to a geometrical solution for the alpha matte. The parabola has a minimum 402 at:

$$\alpha_{min} = \frac{\text{var}(B)}{\text{var}(B)+\text{var}(F)} \quad (7)$$

and is symmetric along the axis $x=\alpha_{min}$.

If $\text{var}(F)=\text{var}(B)$, then there are always two valid solutions to this quadratic equation. Therefore, based on this equation alone, it is impossible to resolve the ambiguity.

Fortunately, in practice, this parabola is shifted substantially to the right, as shown in FIG. 4. This is because the background variance var(B) is typically a few orders of magnitude larger than the foreground variance var(F).

Therefore, we have two cases:

$$\alpha = \begin{cases} = \dfrac{\mathrm{var}(B) - \sqrt{\Delta}}{\mathrm{var}(F) + \mathrm{var}(B)}, & \mathrm{var}(I) \geq \mathrm{var}(F); \\ \approx \alpha_{\min}, & \mathrm{var}(I) < \mathrm{var}(F). \end{cases} \quad (8)$$

If we assume that the lighting in the scene is diffuse, i.e., var(F)=0, then the equation has no ambiguity, and α is determined as:

$$\alpha = 1 - \sqrt{\dfrac{\mathrm{var}(I)}{\mathrm{var}(B)}} . \quad (9)$$

The above derivation also has a intuitive interpretation. We have a linear combination of two variables F and B with variances var(F) and var(B), respectively. Assume that var(F) is less than var(B). We start with a linear combination that is equal to the variable F, and then gradually change the linear combination to the variable B. Initially, the variance of this linear combination decreases, as shown in FIG. 4. This is because by linearly combining two variables we perform some averaging.

Eventually, the variance increases to reach var(B). While the variance is decreasing from var(F) to the minimum and then increasing back to var(B), there are two equally plausible linear combinations that have the same variance.

We can disambiguate the two solutions by generalizing Equation (3) to higher order statistics:

$$\mu_n(I) = \alpha^n \mu_n(F) + (1-\alpha)^n \mu_n(B), \quad (10)$$

where $\mu_n(X)$ is the $n^{th}$ moment of a variable X expressed as:

$$\mu_n(X) = \langle (X - \langle X \rangle)^n \rangle . \quad (11)$$

For example, we pick the solution that satisfies the third moment. Given an expression for alpha, we can determine the alpha-multiplied foreground using:

$$\sum_n I = \sum_n [\alpha F + (1-\alpha)B] \quad (12)$$

$$\sum_n (\alpha F) = \sum_n I - \sum_n [(1-\alpha)B]$$

$$\alpha F = \dfrac{1}{n}\left[\sum_n I - (1-\alpha)\sum_n B\right]$$

Spatial Coherence

We can regularize the solution by enforcing spatial coherence. The solution can be improved by interpolating other bits in the solution from the neighboring samples.

The method works because var(B) is relatively large for practically all real world scenes. In practice, even very specular surfaces have var(F) a few orders of magnitude lower than var(B).

EFFECT OF THE INVENTION

Embodiments of the invention provide a real-time system and method for natural video matting. The method is efficient and produces high quality mattes for complex, real world scenes, without requiring depth information or 3D scene reconstruction.

It is to be understood that various other adaptations and modifications may be made within the spirit and scope of the invention. Therefore, it is the object of the appended claims to cover all such variations and modifications as come within the true spirit and scope of the invention.

We claim:

1. A method for extracting an alpha matte from images acquired of a scene, comprising the steps of:
   selecting a depth plane for a foreground in a scene;
   determining a trimap from a set of images acquired of the scene;
   constructing an epipolar plane image from the set of images and the trimap, the epipolar plane image including scan lines, and in which the identical scan line from all images of the set are stacked in the epipolar plane image, and a 3D point in the scene corresponds to a particular scan line, and an orientation of the scan line corresponds to a depth of the 3D point in the scene;
   measuring variances of intensifies along the scan lines in the epipolar image; and
   extracting an alpha matte according to the variances.

2. The method of claim 1, in which the depth plane is selected interactively by a user.

3. The method of claim 1, in which the depth plane is selected automatically.

4. The method of claim 1, further comprising:
   acquiring the set of images in parallel at a particular instant in time.

5. The method of claim 1, further comprising:
   acquiring a sequence of sets of images; and
   performing the determining, constructing, measuring, and extracting for each set of images.

6. The method of claim 1, in which the set of images are acquired by an array of cameras.

7. The method of claim 6, in which the array of cameras are arranged linearly along a horizontal axis.

8. The method of claim 6, in which the array of cameras are arranged linearly along a horizontal axis and a vertical axis.

9. The method of claim 6, further comprising:
   synchronizing triggers of the array of cameras.

10. The method of claim 6, further comprising:
    calibrating the array of cameras with each other.

11. The method of claim 6, further comprising:
    determining homographies for the array of cameras.

12. The method of claim 6, further comprising:
    defining one camera of the array of cameras as a reference camera; and
    extracting the alpha matte for the image acquired by the reference camera.

13. The method of claim 6, further comprising:
    setting apertures of the array of cameras relatively large to provide a shallow depth of field in the set of images.

14. The method of claim 1, in which the set of images is pre-recorded, and further comprising:
    selecting a plurality of depth planes; and
    performing the determining, constructing, measuring, and extracting for the each set of images at each depth plane to extract alpha mattes for various depth elements in the scene separately.

15. The method of claim 1, further comprising:
    classifying pixels in the trimap as background, foreground, or unknown.

16. The method of claim 1, in which a depth range is associated with the depth plane, and further comprising:

filtering the set of images with a convolution kernel having a size corresponding to the depth range.

17. The method of claim 1, in which the alpha matte is $$\alpha = 1 - \sqrt{\frac{\text{var}(I)}{\text{var}(B)}},$$

where var(I) is a variance of the intensities of all pixels a particular image, and var(B) is a variance of the intensities of background pixels in the particular image.

18. The method of claim 6, in which centers of projection of the cameras are co-planar.

19. A system for extracting an alpha matte from images acquired of a scene, comprising:

means for selecting a depth plane for a foreground in a scene;

an array of cameras configured to acquire a set of images of the scene;

means for determining a trimap from a set of images acquired of the scene;

means for constructing an epipolar plane image from the set of images and the trimap, the epipolar plane image including scan lines, in which the identical scan line from all images of the set are stacked in the epipolar plane image, and a 3D point in the scene corresponds to a particular scan line, and an orientation of the scan line corresponds to a depth of the 3D point in the scene;

means for measuring variances of intensities along the scan lines in the epipolar image; and means for extracting an alpha matte according to the variances.

20. The system of claim 19, in which a sequence of sets of images is acquired by the array of cameras, and the images in each set are synchronized in time, and the alpha matte is extracted for each set of images in the sequence.

* * * * *